(12) United States Patent
Peterfreund

(10) Patent No.: US 8,264,493 B2
(45) Date of Patent: Sep. 11, 2012

(54) METHOD AND SYSTEM FOR OPTIMIZED STREAMING GAME SERVER

(75) Inventor: Natan Peterfreund, Kiryat Tivon (IL)

(73) Assignee: Playcast Media Systems, Ltd., Kiryat Gat (IL)

( * ) Notice: Subject to any disclaimer, the term of this patent is extended or adjusted under 35 U.S.C. 154(b) by 920 days.

(21) Appl. No.: 12/118,999

(22) Filed: May 12, 2008

(65) Prior Publication Data

US 2009/0278842 A1      Nov. 12, 2009

(51) Int. Cl.
*G06T 1/00*    (2006.01)
*G06T 17/20*   (2006.01)
*G06T 17/00*   (2006.01)
*G06T 9/00*    (2006.01)
*G09G 5/00*    (2006.01)

(52) U.S. Cl. ........ 345/522; 345/423; 345/428; 345/555; 345/582

(58) Field of Classification Search .......... 345/502–505, 345/582, 423, 428, 555, 522
See application file for complete search history.

(56) References Cited

U.S. PATENT DOCUMENTS

| 5,742,289 | A | 4/1998 | Naylor et al. |
| 6,154,772 | A | 11/2000 | Dunn et al. |
| 6,668,091 | B1 * | 12/2003 | Kim et al. ..................... 382/243 |
| 6,771,657 | B1 | 8/2004 | Elstermann |
| 6,996,098 | B2 | 2/2006 | Bertram et al. |
| 7,307,638 | B2 | 12/2007 | Leather et al. |
| 7,830,388 | B1 | 11/2010 | Lu |
| 7,868,893 | B2 * | 1/2011 | Feth et al. ..................... 345/522 |
| 8,166,192 | B2 | 4/2012 | Suh et al. |
| 2004/0017850 | A1 | 1/2004 | Kim et al. |
| 2004/0090996 | A1 | 5/2004 | Wu et al. |
| 2004/0213298 | A1 | 10/2004 | Sato |
| 2005/0010960 | A1 | 1/2005 | Kitazawa et al. |
| 2005/0030316 | A1 | 2/2005 | Sirtori et al. |
| 2005/0104889 | A1 * | 5/2005 | Clemie et al. ................. 345/522 |
| 2005/0289619 | A1 | 12/2005 | Melby |
| 2007/0009035 | A1 | 1/2007 | Craig et al. |
| 2009/0119738 | A1 | 5/2009 | Perlman et al. |
| 2009/0193480 | A1 | 7/2009 | Rodriguez |
| 2011/0128961 | A1 | 6/2011 | Brooks et al. |

FOREIGN PATENT DOCUMENTS

| EP | 1391226 | 2/2004 |
| EP | 1496704 | 1/2009 |
| FR | 2893439 | 5/2007 |
| WO | WO 99/64944 | 12/1999 |
| WO | WO-02/092177 | 11/2002 |
| WO | WO 03/075116 | 9/2003 |

OTHER PUBLICATIONS

International Preliminary Report on Patentability for PCT/IB2009/005917 mailed Nov. 25, 2010.

(Continued)

*Primary Examiner* — Hau Nguyen
(74) *Attorney, Agent, or Firm* — Foley & Lardner LLP

(57) ABSTRACT

Exemplary embodiments include an interception mechanism for rendering commands generated by interactive applications, and a feed-forward control mechanism based on the processing of the commands on a rendering engine, on a pre-filtering module, and on a visual encoder. Also a feedback control mechanism from the encoder is described. The mechanism is compression-quality optimized subject to some constraints on streaming bandwidth and system delay. The mechanisms allow controllable levels of detail for different rendered objects, controllable post filtering of rendered images, and controllable compression quality of each object in compressed images.

20 Claims, 8 Drawing Sheets

OTHER PUBLICATIONS

Zhang et al., "Study on Adaptive Job Assignment for Multiprocessor Implementation of MPEG2 Video Encoding," *IEEE Transactions on Industrial Electronics*, vol. 44, No. 5, Oct. 1997, pp. 726-734.

International Search Report and Written Opinion for PCT/IB2009/005917 mailed Mar. 25, 2010.

Cheng, L. et al., "Real-Time 3D Graphics Streaming Using MPEG-4," *School of Information and Computer Science, University of California*, Irvine, CA, Jul. 18, 2004, pp. 1-16.

Invitation to Pay Additional Fees and, Where Applicable, Protest Fee and Annex to Form PCT/ISA/206 Communication Relating to the Results of the Partial International Search issued in PCT/IB2009/005917 mailed Nov. 16, 2009.

Non-final Office Action received for U.S. Appl. No. 12/125,359 dated Apr. 14, 2011.

Notice of Allowance; In re: U.S. Appl. No. 12/180,944; Dated: Jul. 10, 2012; Applicant: Natan Peterfreund; (7 pgs.).

* cited by examiner

METHOD AND SYSTEM FOR OPTIMIZED STREAMING GAME SERVER

CROSS REFERENCE TO RELATED APPLICATIONS

The present application is related to U.S. patent application Ser. No. 12/125,359 entitled "Centralized Streaming Game Server."

FIELD

Embodiments of the present application relate to the field of 3-D scene control of interactive graphical applications. Exemplary embodiments relate to 1) the systems and methods for graphical rendering and processing of video frames generated by interactive graphical applications, 2) the compression of the generated frames, and 3) the streaming process of the compressed data through communication channels.

BACKGROUND

Computer animation refers to a computer generated image sequence, wherein a set of pre-defined three-dimensional (3-D) objects which constitute a 3-D world scene are projected into a virtual camera at a fixed sampling interval, resulting with a camera view of the 3-D scene through projected frames.

Examples of computer animation products are video cartoons in which the cartoon objects and their behaviors (e.g. position, motion, interaction etc.) in the scenes are defined by a fixed, deterministic program. More sophisticated applications are computer games in which some parts of the objects' behaviors are controlled by users through hardware game controllers, and some other parts are controlled by software programs which simulate the behavior and interaction of these objects.

In computer-generated image sequences, the entire information on the state of each object in an image scene, such as position, motion and texture, is known. Furthermore, the state of each object is controllable, enabling full control on the projected image of each object. Examples of computer graphics methods that affect the visual details of projected image are: the vertices LOD at the 3-D representation level, and the mip-map and anisotropic filtering at the texture level.

In a multi-user game, the objects in 3-D game scenes are controlled by more than one player. Each user controls a specific set of objects in the scene, and has its own viewing camera. A multi-user game system can be based on a centralized game server which computes the state of a 3-D scene based on the users inputs and clients. Each user client computes and renders the specific user's state based on any scene updates sent by the centralized server and by the user's input control and viewing angle.

A centralized game server can also serve single game users, where for each game user, the state of game scene can be either computed in the server, or on the user's client, or can be arbitrary partitioned between the server and the client.

The streaming methods employed between the centralized game server and the clients, and the type of computations employed on them, depend on the underlying communication channel and on the client type. Web games use broadband communication channel, such as DSL, and PC clients. They are mainly based on Shockwave and on Java applications that run on the PC client side. For example, a particular game streaming method downloads in real time, chunks of a game application to the client PC, while the PC runs the application.

A related method is based on a centralized game server which executes game applications and streams the compressed audio/visual information to the client side. This method uses a "dumb" thin client which only decodes and presents the audio/visual compressed data.

In some systems, the compression methods used are based on the MPEG2 or H.264 visual compression standards and on the MPEG2, AAC or AC3 audio compression standards. The streaming is based on the MPEG2 system and/or on IETF IP packetisation. The type of compression and streaming method chosen, is based on the types of the clients and of the communication channels.

MPEG2 and H.264 visual compression standards are based on entropy coding of motion compensated image blocks of fixed size, named macroblocks, in which the target image is partitioned. The motion compensation can be done relative to some previous and/or upcoming reference pictures.

In the past, some systems have been presented in which the rendering and encoding modules are combined into a hybrid rendering-encoding module, wherein the rendering output is directly fed to the encoding module. This reduces the processing latency and the redundant computation repeated at the encoding side. Such systems, employ the MPEG2 as a visual compression standard, and present a method for motion estimation of a set of partitioned image regions that is based on averaging the geometric optical flow between target and reference image frames.

There is another system which includes instruction interception functions for intercepting the rendering commands to the main graphics processor. This system generates a second set of rendering commands to a sub-graphic processor. The graphics data generated by the sub-graphics processor is used to generate the motion information for the video compression stage of a video sequence generated by their main graphics processor. The systems aim to provide faster compression computation, thus reducing the overall system latency.

Overall, there are systems that disclose methods which reduce computation overhead at the encoder side and provide accurate motion information that are derived directly or indirectly from the original 3-D scene. However, these systems don't deal with the major problem of the streaming server that includes the optimization of visual quality of the streaming video, and end-to-end system delay for encoding, streaming and decoding.

The quality of compressed video streaming can be constrained by two parameters: 1) system bandwidth that is measured in bits-per-second, and 2) end-to-end system delay that is measured in seconds. Both restrictions imply constraints on the size of the compressed frames and hence on the resultant compressed video quality.

In natural video, the size of compressed frames can be controlled by visual encoders through pre-filtering of input frames, through sophisticated motion estimation techniques (which try to estimate and model the exact motion of different objects in the scene, thus minimizing the motion compensated error difference of the encoded blocks), and through the increment of quantization level of the transformed motion compensated blocks.

Video encoders of natural video which are based on existing compression standards (such as MPEG2 or MPEG4), employ various techniques to accommodate the above constraints on compressed frames. However, the pre-filtering or quantization which does not match the visual content (e.g. does not distinguish between different objects and between regions of interest to other parts of the frame that are of less interest) will result in poor image quality. The motion estimation may fail in complex visual scenarios where actual motion cannot be accurately estimated using the limited computational resources of encoders. This may produce poor motion compensation and accordingly poor encoding quality.

Professional video encoders for cable TV and for satellite broadcast, which are based on the above MPEG compression standards, are designed with 1-2 seconds end-to-end system delay. They enable multi-path encoding of the video sources, and accommodate the large variations of size in compressed pictures that may be present due to the unpredictable nature of natural visual scenes, through the introduction of a large system delay. Large delays are unacceptable in streaming systems of interactive applications, which requires less than 200 mili-seconds respond time. In fast motion gaming, such as in First Person Shooter (FPS) games, the delay requirements may be even tighter.

SUMMARY

Aspects of the exemplary embodiments are directed to an interception mechanism of rendering commands generated by interactive applications, and a feed-forward control mechanism based on the processing of the commands on a rendering engine, on a pre-filtering module, and on a visual encoder. Aspects of the exemplary embodiments also include a feed-back control mechanism from the encoder. The mechanism is compression-quality optimized subject to some constraints on streaming bandwidth and system delay, with respect to the interactive applications, rendering commands, and pre-processing modules. The mechanisms allow controllable levels of detail for different rendered objects, controllable post filtering for rendered images, and controllable compression quality for each object in compressed post filtered images.

In another exemplary embodiment, a mechanism for processing and streaming of multiple interactive applications in a centralized streaming application server is disclosed.

In another exemplary embodiment, a method is presented for statistical multiplexing of a plurality of interactive applications. Statistical multiplexing refers to encoding and streaming of multiple visual sources under common shared streaming bandwidth. This method dynamically allocates a streaming bandwidth between a plurality of video compression sources, in a way that maintains equal or weighted compression quality for all the sources. As such, the interactive applications are processed and compressed in view of the common shared streaming bandwidth and of available computation resources for running, rendering, and encoding of the interactive applications in a given time interval.

DETAILED DESCRIPTION

Exemplary embodiments are described below with references to the accompanying drawings. It should be understood that the following description is intended to describe exemplary embodiments, and not to limit the invention defined in the appended claims.

Figure 1:
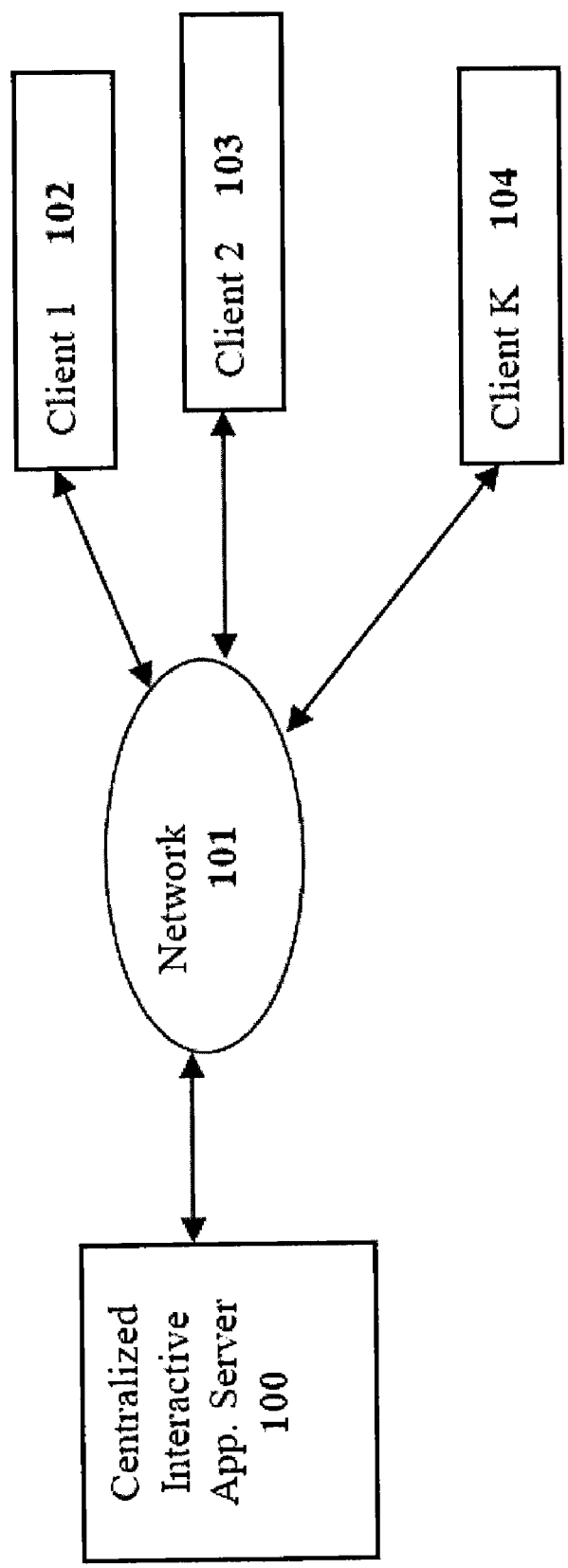
FIG. 1 illustrates the schematic diagram of a centralized interactive streaming system.

FIG. 1 illustrates the block diagram of a centralized interactive application system, including a centralized interactive application server 100, which runs the 3-D interactive graphics applications, and streams the compressed audio/visual content to the client side 102-104, through the communication network 101. Examples of communication networks which are suitable for this application are cable TV and ethernet IPTV. The interactive applications can be common to a group of clients, which is applicable for the case of Massively-Multi-Online-Gaming (MMOG) wherein a group of users interact in a common virtual world, or independent for each client, as in the case of regular online PC games. Each client, which is required to have the basic functionality of a digital TV STB, decodes the compressed stream and displays the audio/visual content on the TV monitor. The STB controller commands, mapped to the application commands either at the STB or the centralized server, are sent back to the centralized server to provide a complete interactive application experience.

Figure 2:
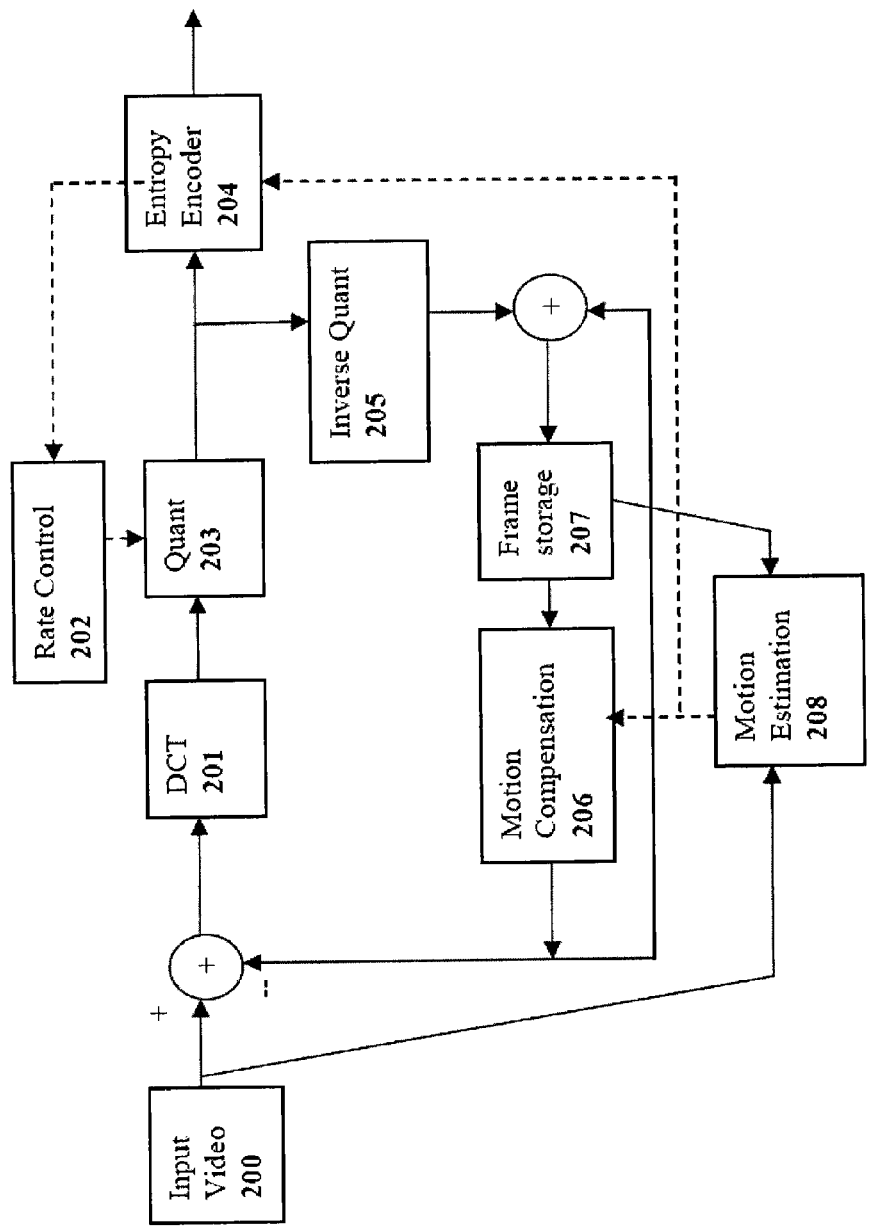
FIG. 2 illustrates the block diagram of an MPEG video encoder.

Aspects of the exemplary embodiments invoke video and audio compression methods to compress and stream the audio-visual image sequences generated by the interactive applications to the client side. A block diagram of an MPEG2 video encoder is illustrated in FIG. 2. Other video encoder standards which apply to the exemplary embodiments, such as H.264 and MPEG4, have a similar processing structure.

Figure 3:
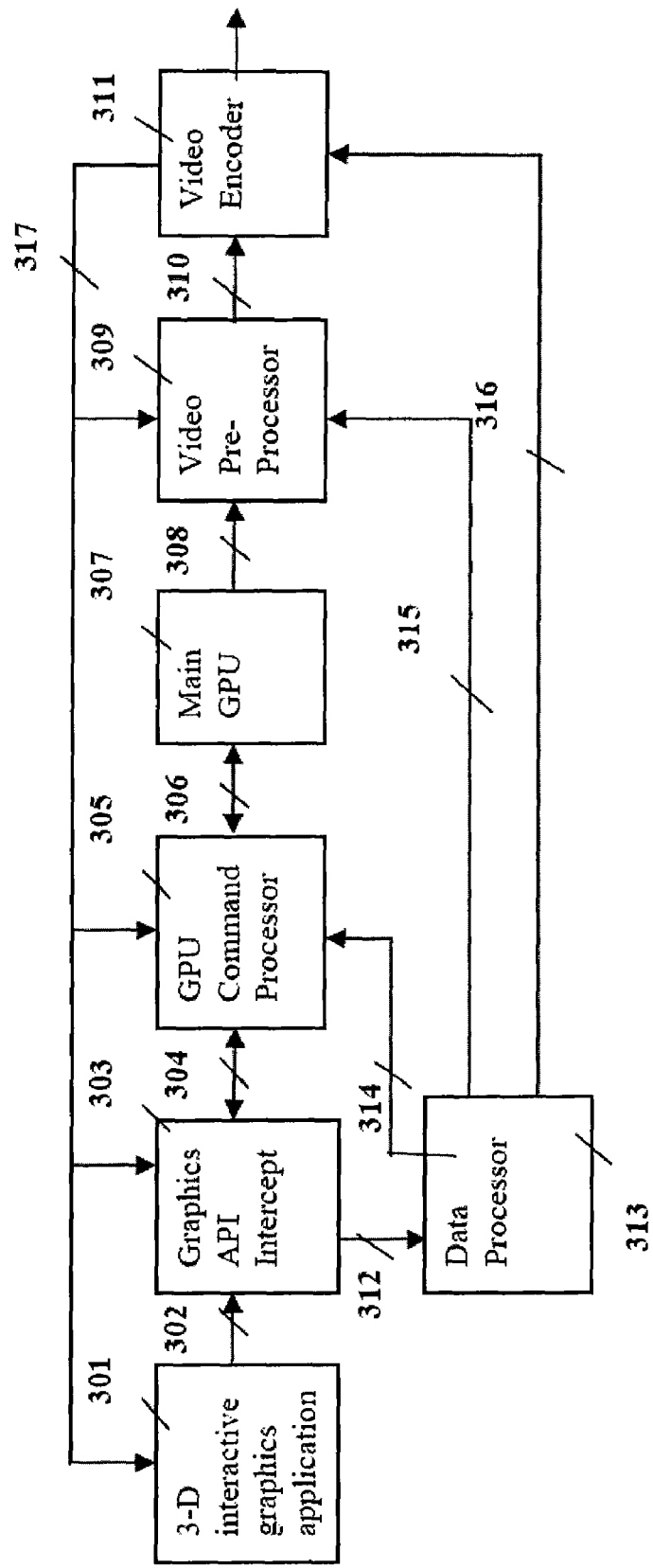
FIG. 3 illustrates the block diagram of a system for synthesizing a compressed bit-stream from an interactive 3-D application, according to an exemplary embodiment.

FIG. 3 shows the block diagram of a system for synthesizing a compressed bit-stream of an interactive 3-D graphics application, according to an exemplary embodiment. The 3-D interactive graphics application 301 computes the 3-D world state, which describes the position and appearance of all the objects which constitute the scene, at a controllable frame rate. For each computed frame state, the states of the objects and camera parameters are sent through a dedicated low-level graphics API, such as DirectX or OpenGL, to the main graphics processor unit (GPU) 307. In most cases, the interactive graphics application is provided as an executable file and thus cannot be modified. A graphics API Interception 303 of rendering commands 302, intercepts the API graphics commands, providing a mechanism for control and processing of the rendering commands and hence of the generated video frames.

The exemplary embodiment contains a GPU command processor 305 that processes the intercepted rendering commands 304 and generates a modified set of rendering commands 306 to the main GPU 307, which then renders a modified frame sequence 308. An example of a modified frame sequence is a sequence with reduced level of detail at certain rendered objects.

A video pre-processor 309, performs spatial and temporal filtering on the frame sequence to generate a filtered version 310. Examples of filtering types are bilateral spatial filtering and motion-compensated-temporal filtering (MCTF). This module can be realizable by the main GPU 307 but cannot be combined with the frame rendering process, as it is linked with an encoder feedback control.

The video encoder 311 encodes and generates a compressed bit-stream of the pre-processed frame sequence. Preferably, the encoder is based on MPEG2 or on H.264 visual encoding standard. Optionally, it may use other propriety standards.

An exemplary embodiment discloses two control methods to optimize the encoding and streaming quality of the interactive application on the GPU command processor 306, the video pre-processor 309, the video encoder 311, and the 3-D interactive graphics application. Note that in case the interactive application is provided as an executable file, the level of control degenerates to functionalities related to the interaction with external resources such as OS and I/O drivers and APIs. The two methods are: 1) a direct feed-forward control, which is based on the processing of a subset of extracted rendering commands 312 by data processor 313, and 2) a feed-back control 317 from the encoder that optimizes the rate, quality and level of the detail of the rendered frames subject to a measure of encoding quality and subject to the available encoding bandwidth. Note that whereas the feed-forward control is based on a pre-analysis of the rendering commands, the feed-back control is based on a present measure of compression quality.

Preferably, the graphics API intercept 303, extracts a set of object-level data 312, referring to the visual complexity and to the motion of the objects in the scene. Preferably, the object data includes: object identity, 3-D mesh data, depth map in camera view-space, model view and projection matrices, and texture maps. Optionally, it may include behavioral or other visual related information.

The object data 312 is processed by the data processor 313, to generate a feed-forward control on the GPU command processor 305, the video pre-processor 309 and the video encoder 311. An example of the type of information which is computed by the data processor as feed-forward control for next processing units, is the frame-level region of interest that defines the desired level of detail for each object in the scene. This information controls the rendering detail at the GPU level, through control 314 on the GPU command processor 306, the filtering level 315 at the video pre-processor 309, and the quantization level 316 at the video encoder 311. This module also computes a motion compensation estimate for each macroblock in the target encoded frame in video encoder 311.

Whereas the feed-forward control defines the relative detailed level of each object in the rendered images, the feed-back control from the video encoder "tunes" that to match the available stream bandwidth, and to optimize encoding quality. This will lead to a quality optimized rendering and encoding scheme.

Figure 5:
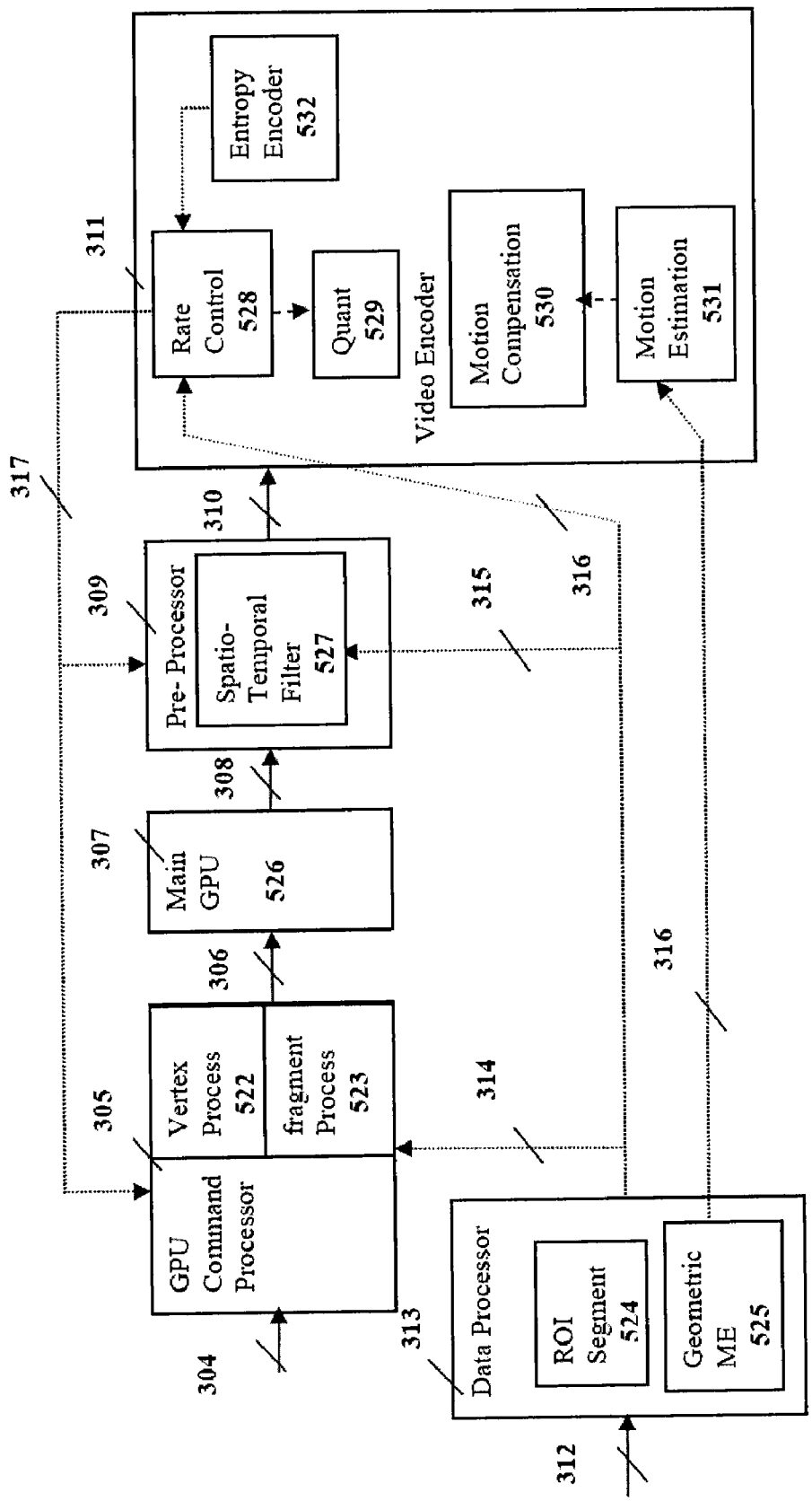
FIG. 5 illustrates the feed-forward control of the visual data processor.

A detailed description of the feed-forward and feedback control on the processing of the GPU command processor 306, the video pre-processor 309, and the video encoder 311, is provided in the description of FIG. 5.

Figure 4B:
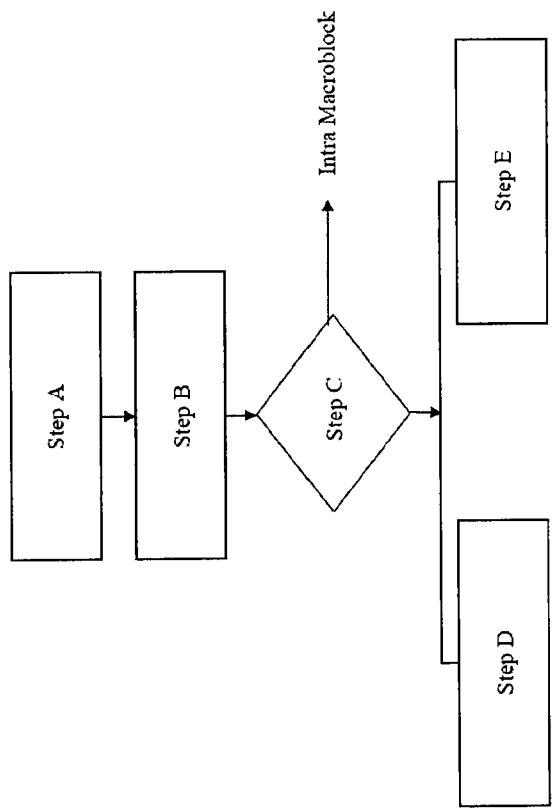
FIG. 4b illustrates the steps of a motion estimation algorithm according to an exemplary embodiment.
Figure 4A:
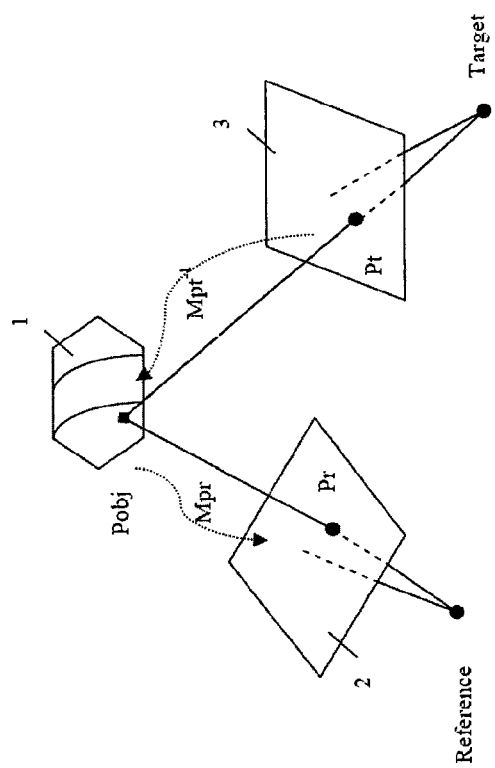
FIG. 4a illustrates the projection geometry of a 3-D object model into 2-D frame coordinates, and the geometry of geometric motion estimation.

FIG. 4a illustrates the geometry of a 3-D object projection into camera viewport coordinates, and the geometry of a 3-D rigid motion between successive frames. The projection of a 3-D object point $Pobj=[xo, yo, zo, 1]^T$ into a reference camera viewport coordinates $Pr=[xr, yr, zr, 1]^T$ is given by:

$$Pr=1/w[Mpr*Pobj]$$

where $Mpr=M_{viewport}*M_{projection}*M_{modelview}$ and the matrices are the camera viewport and projection matrices and the object model view matrix, respectively, and w is the last coordinate of the result of Mpr*Pobj. The estimation of motion field estVt at a point Pt in the target frame, relative to the reference frame, is given by projection of the object point, resulting from inverse projection of Pt, into the reference frame:

$$estPr=1/w[Mpr*Mpr^{-1}*Pt]$$

$$estVt=estPr-Pt$$

There is a special case where estVt is not the true motion field at Pt in target frame. This happens when Pr in the reference frame relates to a different closer object, hence the depth value of Pr is less than the computed estPr. In this case, the motion field is not defined. The final motion field Vt at a point Pt in the target frame is thus given by the following algorithm (here z(C) denotes the z coordinate component of the vector C):

if z(estpr)=z(Pr), then Vt=estVt;
otherwise, Vt not defined

The video encoder makes use of the motion field estimation in above to derive the optimal motion vector for each macroblock in the target frame. An exemplary embodiment discloses a motion estimation algorithm of each macroblock in the target frame relative to the reference frame, which is based on the motion field measure shown above: The overall structure of the algorithm is shown in FIG. 4b, and it is briefly outlined below. Additional, fewer, or different steps may be performed, depending on the implementation.

Step A: Define the object ID for each pixel in the target and reference frames, an object ID can be based on some common object parameters such as: the number of vertices and vertices parameters. Each object is attached with matrix projection data $M_{projection}$ and $M_{modelview}$.

Step B: For each object ID pixels (i,j) in the target macroblock, compute the motion field Vt(i,j) relative to the reference frame. Here Mpr is given by the model view and projection matrices in reference frame of the same object ID.

Step C: If the number of not-defined Vt(i,j) in the macroblock exceeds a given threshold N, the macroblock is defined to be an Intra macroblock.

Step D: Otherwise, the macroblock motion mbV is given by the solution of the following functional: min $\Sigma i,j$ in MB $f(i,j)$ $(mbV-Vt(i,j))^2$. The solution is given by: $mbV=1/F*\Sigma i,j$ in MB $f(i,j)*Vt(i,j)$, where $F=\Sigma i,j$ in MB $f(i,j)$. The value $f(i,j)$ defines the relative "importance" of the different computed motion fields vectors Vt(i,j). Candidates for f(i,j) can be the intensity or the derivative of intensity at pixel (i,j) in the Target frame.

Step E: An alternative algorithm to d, is based on the following: let minVx=min x(Vt(i,j)); minVy=min y(Vt(i,j)); maxVx=max x(Vt(i,j)); maxVy=max y(Vt(i,j)); where x(C) and y(C) define the x and y coordinates of the vector C. mbV is given by a SAD search in the reference frame in the region defined by [minVx, maxVx]×[minVy, maxVy] relative to the macroblock position.

FIG. 5 describes the data processor 313, the feed-forward control to the GPU command processor 305, the feed forward control 315 and 316 to video pre-processor 309, and the video encoder 311. The index associated with each block and each interface is identical to that in FIG. 3.

Preferably, the data processor 313 computes the following controls: 1) a region of interest (ROI) segmentation, which assigns a level-of-interest index between 1 . . . M for some M, defining the assigned relative visual quality, for each object region in the rendered frame, where 1 refers to the highest level and M to the lowest; and 2) a macro-block level geometric ME; preferably based on the algorithm of FIG. 4b.

A level-of-interest based control 314 to the GPU command processor 305 controls the modified rendering commands 306, on the object-level texture resolution, through the fragment process module 523, and on the levels of the details of the 3-D mesh data, through a vertex process module 522.

A candidate for level-of-interest segmentation algorithm: An object is classified by a level-of-interest index J in [1, ... M] where 1 and M refer to the highest and to the lowest level-of-interest, respectively, if one of the following holds: 1) The average (or minimal) depth of the object in camera view space is larger than a given threshold; 2) The model-view of the object is only changed by the camera view space matrix relative to previous frame (Zero motion condition), and depth condition holds for less restricted depth threshold; 3) Zero motion condition along with a set of sequential frames; 4) Preferably, each level-of-interest index j is assigned with specific thresholds with e.g. depth threshold for index j+1 larger than the depth threshold of index j for each of the above algorithms; and 5) Optionally, the feed-back control 317 from video encoder 311 may be used to control the above thresholds.

Preferably, the generated rendering commands 306 is a modified version of the intercepted graphics API commands 304 such that:
  a. Level-of-interest index range is partitioned into four level-of-interest regions: highest, mid-high, mid-low and lowest.
  b. Rendering commands of objects with level-of-interest index j controlled by the feed-forward control 314, will lead to:
    i. no change, if index belongs to given highest level-of-interest region.
    ii. a reduction in the texture map resolution, which may be controlled by MIPMAP parameter, or by other filtering means, if it is detected to belong to the mid-high level-of-interest region.
    iii. a move to a lower level of 3-D mesh detail description (LOD), if detected to belong to mid-low level-of-interest region.
    iv. a drop of the rendering command of the object, if detected to belong to lowest level-of-interest region.
  c. The feedback control 317 is used to tune the above regions (e.g. reduce highest level-of-interest region and increase the size of the other regions in case of shortage in available encoding bits). This is aimed to result in a higher filtering level.

Similar control mechanisms apply to the video pre-processor. In this case, the feed-back control from the video-encoder enables tuning of filtering level during encoding: e.g. next frame macroblock is pre-processed depending on the available encoding bits and depending on the present encoding quality measure.

Certain video encoder modules are directly controlled by the feed-forward control 315 and 316. Preferably, the level of interest feed-forward control 316 defines the quantization level of the transformed block wherein lower level-of-interest regions are assigned higher quantization values. The macroblock motion compensation value is computed based on the geometric ME explained above, and the motion estimation algorithm presented above.

Figure 6:
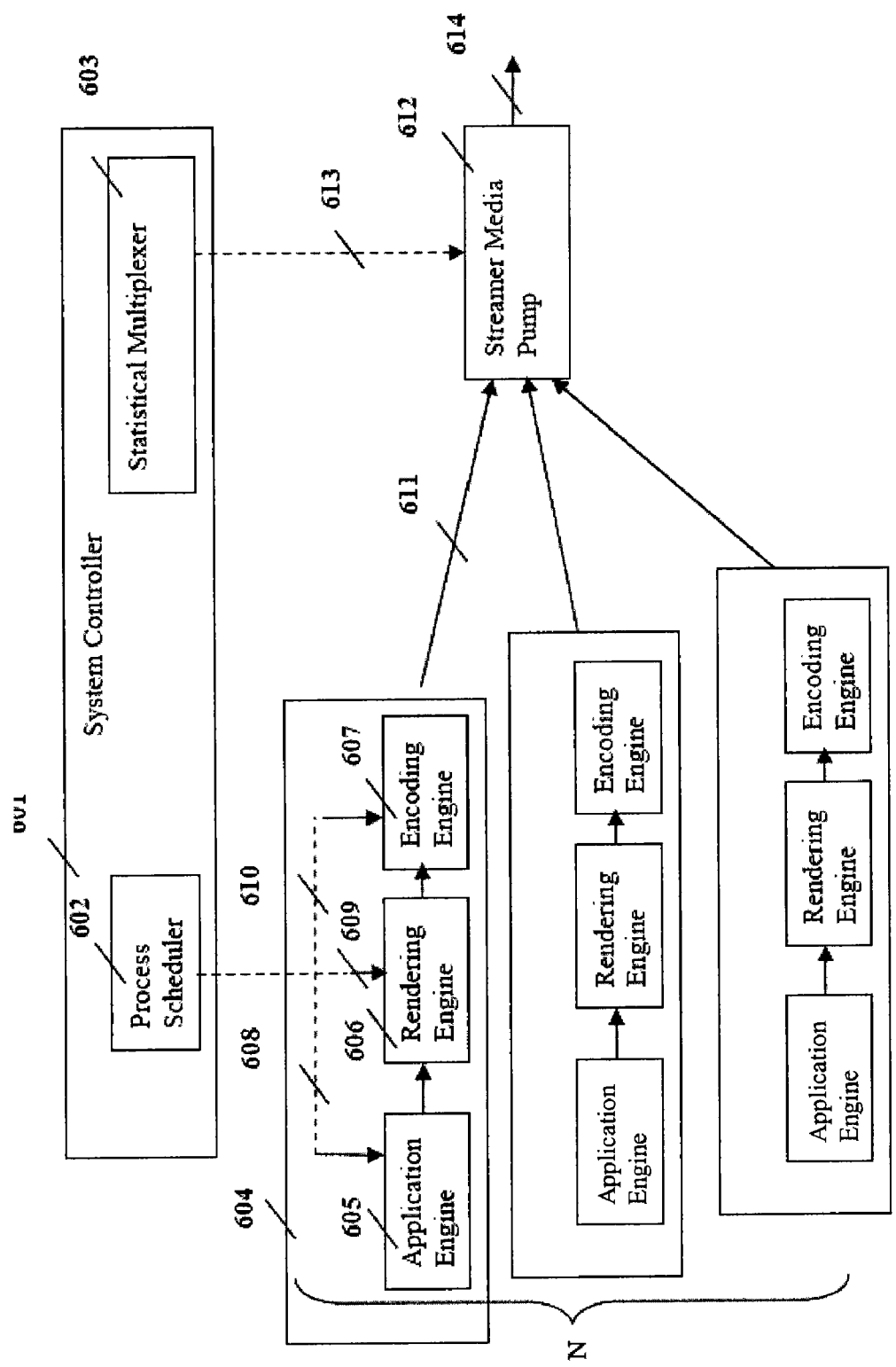
FIG. 6 illustrates the block diagram of processing and streaming of N systems for synthesizing compressed bit-streams.

In the following a system for synthesizing a compressed bit stream of an interactive 3-D graphics application shall be referred to as system for interactive application streaming. FIG. 6 illustrates the architecture of a centralized interactive application server of a system for synthesizing a compressed bit-stream of a plurality of interactive 3-D graphics applications. The system includes a system manager/controller 601, a plurality of systems for interactive application streaming system 604, here defined to be N, and a streamer media pump 612 which controls and streams the N generated streams 611 through a shared common streaming channel 614.

A general system for interactive application streaming includes the processing modules: an application engine 605, which simulates the state of the 3-D world scene, a rendering engine 606, which renders the image frames, and the encoding engine 607, which encodes the rendered frames. Referring to FIG. 3, blocks 301-307 refer to the application and to the rendering engines, and 310, 311 to the encoding engine. This scheme may include buffering mechanisms between the engines, such as e.g. double or triple buffering, in case these engines require synchronization mechanisms.

Preferably, the system controller 601 includes two main modules: the process scheduler 602 and the statistical multiplexer 603. The process scheduler 602 schedules the processing time of the application engines 605, the rendering engines 606 and the encoding engines 607 of the plurality of systems for interactive application streaming. The statistical multiplexer 603 allocates a shared common bandwidth between the plurality of systems in a manner that maintains a same or a weighted encoding quality for the encoded streams. The statistical multiplexing algorithm is elaborated below with reference to FIG. 8.

Though referred only to the visual aspect, the above system applies also to the audio/voice processing of the applications, where the application engine computes the audio sources states, the rendering engine synthesizes the generated audio frame, and the audio encoder encodes the generated audio frame.

The system in FIG. 6 may include also a plurality of video encoders or transraters of natural audio-visual sources, providing means for statistical multiplexing of a plurality of systems for interactive application streaming with a plurality of video encoders of natural audio-visual sources.

Figure 7:
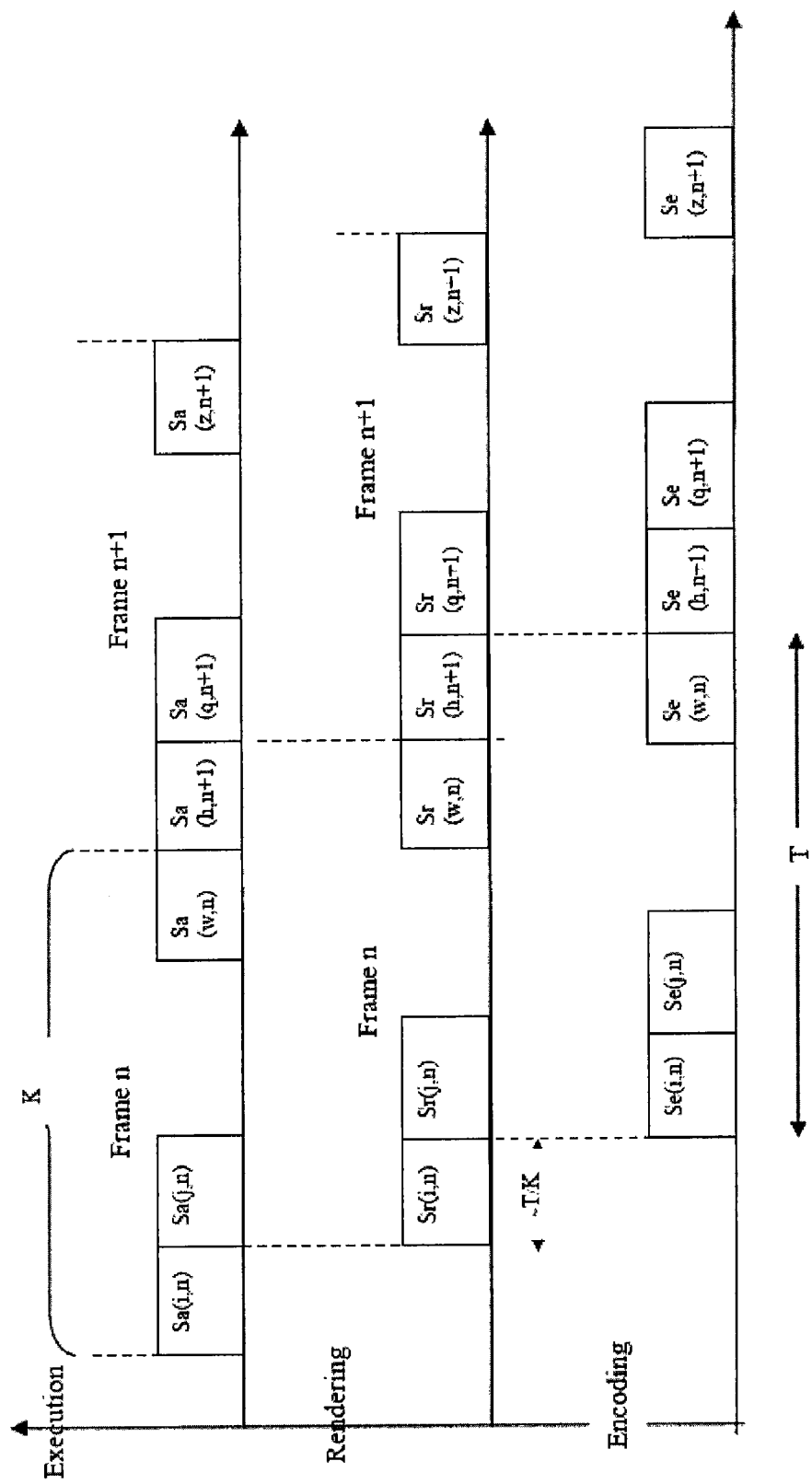
FIG. 7 illustrates the timing for the scheduler processing.

FIG. 7 illustrates the scheduling of frame processing engines of the process scheduler, for N systems for interactive application streaming. According to an exemplary embodiment, for each frame period T, the system processes K<N services in a manner that maintains same or weighted visual quality for the N generated streams. The unprocessed N-K "skipped" services, are chosen according to a minimal visual effect criteria, which skip processing the services which are least visually affected from that. An example for skipped criteria is the average motion between successive frames.

FIG. 7 illustrates the scheduling of the application engines, the rendering engines and the encoding engines of the K processed services. Here $Sa(i,n)$, $Sr(i,n)$ and $Se(i,n)$ refer to the processing time intervals of the application, the rendering and the encoding engines of the interactive service number i at frame number n. According to present scheme, the processing time of the different engines are time shifted relative to the others, resulting with minimal processing delay from start to end of a single frame processing of ~3T/K for the K services, and with worst case respond time to input control of 1/T for all K services. In a single threaded system, $Sa(i,n)$, $Sr(i,n)$ and $Se(i,n)$ are coupled together, so that the processing of the K services is based on processing of the triple ($Sa(i,n)$, $Sr(i,n)$, $Se(i,n)$) of the K services, one after the other, within a frame period T.

The above processing assumes equal computation time for the processing engines of the plurality of systems. In general the processing requirements of these engines need not be identical and may be allocated according to various of computation criteria such as e.g. computation complexity. The computation resources in this case could then be dynamically allocated to each engine, so that the time scheduling described in FIG. 7 will still hold. Other non-uniform processing allocation for the different engines of the different services, may be defined, provided the sum of processing time of either of the processing engines Sa(:,n), Sr(:,n) and Se(:,n) of the K selected services, never exceed the frame time T. In the case of single threaded application, as described above, each service processing triple (Sa(i,n), Sr(i,n), Se(i,n)) may be allocated with different processing time according to the processing criteria in use, however the sum of processing time of the selected services should never exceed the frame time interval T.

Figure 8:
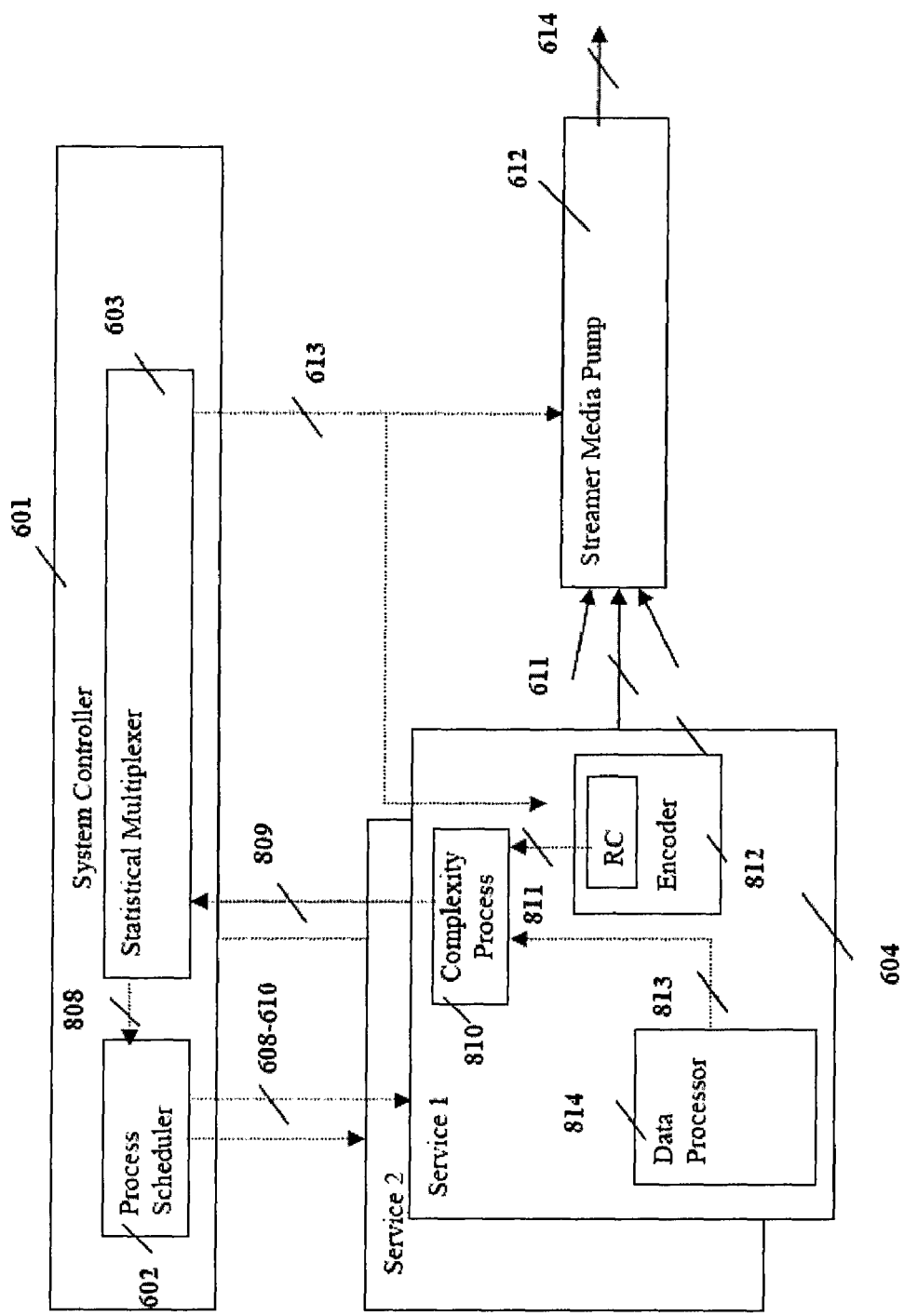
FIG. 8 illustrates a block diagram of the statistical bit-allocation of N systems for synthesizing compressed bit-streams.

FIG. 8 illustrates a block diagram of the statistical scheduling and statistical multiplexing of N systems for interactive application streaming, sharing a common processing resource and output streaming bandwidth, and providing equal or weighted encoding quality for the N services. The system comprises a system controller 601, which schedules a processing for K selected services 604 during each frame time and allocates output streaming bandwidth for the N services, and a streamer media pump 612, which multiplexes the N generated compressed streams to a common channel output 614. The statistical multiplexer 603 computes the relative bit-allocation 613 for each service, and selects the K<N processed services 808 for the process scheduler 602 based on the complexity measures 809 computed by each service. The complexity process 810 computes the complexity measures for the service based on frame-level encoding/complexity measure 811 generated by the encoder 812, and on visual complexity measure 813 computed by the data processor 814.

The above system may contain also a plurality of video encoders of natural video sources, providing means for statistical multiplexing of a plurality of systems for interactive application streaming with a plurality of video encoders of natural video sources. The same applies also for video transcoder/transrater sources. In this case, the service module 604 degenerates to the encoder module 812.

The foregoing description of exemplary embodiments has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

The invention claimed is:

1. A system for synthesizing a compressed video bit stream from an interactive three-dimensional (3-D) graphical application, the system comprising:
    means for processing an interactive application, frame by frame, wherein each frame comprises a plurality of objects;
    means for interception of a set of graphical rendering commands generated by the processing of the interactive application;
    means for extraction of a set of geomtric and texture information from the intercepted set of commands per object;
    means for generating a modified set of graphical commands;
    means for rendering image frames from the modified set;
    means for pre-processing of the rendered image frames;
    means for encoding of the pre-processed image frames;
    means for controlling the means for generating, the means for rendering, the means for pre-processing, and the means for encoding based on a measure of encoding quality; and
    means for defining a level of detail of rendered images based on a pre-analysis of the extracted geometric and texture information, wherein the means for defining a level of detail of rendered images comprises a level-of-interest based control that is based on a region of interest segmentation process in which a relative visual quality value is assigned to objects in a respective frame.

2. A system according to claim 1, further comprising means for computing two dimensional (2-D) visual information from the extracted geometric and texture information.

3. A system according to claim 2, wherein the 2-D visual information is computed 2-D motion field relative to a reference frame, a level-of-interest classification for each object in rendered image frames and a foreground/background segmentation.

4. A system according to claim 2, further comprising means for controlling the modified commands based on any-one of computed two-dimensional (2-D) visual information.

5. The system according to claim 4, wherein the means for controlling the modified commands comprise means for inserting a dedicated level of detail for each object in the rendered image frames.

6. A system according to claim 2, further comprising means for controlling the pre-processing based on the computed two-dimensional (2-D) visual information.

7. A system according to claim 2, further comprising means for controlling the encoding modules based on the computed two-dimensional (2-D) visual information.

8. A system according to claim 7, further comprising means for controlling entropy encoding, quantization and motion estimation, based on the computed two dimensional (2-D) visual information.

9. A system according to claim 1, further comprising means for controlling the encoding means based on an encoding quality criteria.

10. The system according to claim 1, further comprising:
    means for defining a level of detail of rendered images based on a pre-analysis of the extracted geometric and texture information; and
    means for modifying the defined level of detail of the rendered images.

11. A system for synthesizing a compressed video bit stream from an interactive three-dimensional (3-D) graphical application, the system comprising:
    an interception device configured to intercept a set of graphical rendering commands generated by processing of the interactive 3-D graphical application;
    an extraction device configured to extract a set of geometric and texture information from the intercepted set of commands per object;
    a processing device configured to generate a modified set of graphical commands;
    a rendering device configured to render image frames from the modified set;
    a pre-processing device configured to pre-process the rendered image frames;
    an encoding device configured to encode the pre-processed image frames;
    a feed-back control device configured to control the processing device, the rendering device, the pre-processing device, and the encoding device based on a measure of encoding quality; and a feed-forward control device configured to define a level of detail of rendered images based on a pre-analysis of the extracted geometric and texture information, wherein the feed-forward control devices comprises a level-of-interest based control that is based on a region of interest segmentation process in which a relative visual quality value is assigned to objects in a respective frame.

12. The system according to claim 11, wherein the feed-back control device is further configured to modify the defined level of detail of the rendered images.

13. The system according to claim 12, wherein the feed-back control device is configured to modify the defined level of detail of the rendered images based on a present measure of compression quality.

14. The system according to claim 13, wherein the feed-back control device is configured to modify the defined level of detail of the rendered images based on an available stream bandwidth.

15. The system according to claim 11, further comprising a second processing device configured to process an interactive 3-D graphical application, frame by frame, wherein each frame comprises a plurality of objects.

16. A method for synthesizing a compressed video bit stream from an interactive three-dimensional (3-D) graphical application, the method comprising:
processing an interactive 3-D graphical application, frame by frame, wherein each frame comprises a plurality of objects;
intercepting a set of graphical rendering commands generated by the processing of the interactive 3-D graphical application;
extracting a set of geometric and texture information from intercepted set of commands per object;
generating a modified set of graphical commands;
rendering image frames from the modified set;
pre-processing the rendered image frames;
encoding the pre-processed image frames;
controlling, via a feed-back control device, the generating, the rendering, the pre-processing, and the encoding based on a measure of encoding quality; and
defining, via a feed-forward control device, a level of detail of rendered images based on a pre-analysis of the extracted geometric and texture information, wherein the feed-forward control devices comprises a level-of-interest based control that is based on a region of interest segmentation process in which a relative visual quality value is assigned to objects in a respective frame.

17. The method according to claim 16, further comprising:
defining a level of detail of rendered images based on a pre-analysis of the intercepted set of rendering commands;
modifying the defined level of detail of the rendered images based on an encoding quality criteria.

18. A method for synthesizing a compressed video bit stream from an interactive three-dimensional (3-D) graphical application, the method comprising:
providing an interception mechanism to intercept a set of rendering commands generated by an interactive 3-D graphical application;
providing a processing mechanism for the intercepted commands;
providing a feed-forward control mechanism configured to define a level of detail of rendered images based on a pre-analysis of the intercepted set of rendering commands, wherein the level of detail is defined according to a region of interest segmentation process in which a relative visual quality value is assigned to objects in a respective frame;
providing a feed-back control mechanism from an encoder, wherein the feed-back control mechanism is configured to modify the defined level of detail of the rendered images based on an encoding quality criteria; and
modifying the rendered images based on the feed-forward control mechanism and the feed-back control mechanism to optimize compression quality subject to a streaming bandwidth constraint and a system delay constraint.

19. A system for synthesizing a compressed video bit stream from an interactive three-dimensional (3-D) graphical application, comprising:
an interception device configured to intercept a set of rendering commands generated by an interactive 3-D graphical application;
a processing device for the intercepted set of rendering commands;
a feed-forward control device configured to define a level of detail of rendered images based on a pre-analysis of the intercepted set of rendering commands, wherein the level of detail is defined according to a region of interest segmentation process in which a relative visual quality value is assigned to objects in a respective frame;
a feed-back control device configured to modify the defined level of detail of the rendered images based on an encoding quality criteria; and
programmed instructions configured to modify the rendered images according to data generated by the feed-forward control device and the feed-back control device to produce an optimized compression subject to a streaming bandwidth constraint and a system delay constraint.

20. The method according to claim 18, wherein the modifying the rendered images comprises at least one of modifying levels of details for different objects within the respective rendered images, modifying post-filtering of the rendered images, or modifying the compression quality of different objects within the respective rendered images.

* * * * *

UNITED STATES PATENT AND TRADEMARK OFFICE
CERTIFICATE OF CORRECTION

| | | |
|---|---|---|
| PATENT NO. | : 8,264,493 B2 | Page 1 of 1 |
| APPLICATION NO. | : 12/118999 | |
| DATED | : September 11, 2012 | |
| INVENTOR(S) | : Natan Peterfreund | |

It is certified that error appears in the above-identified patent and that said Letters Patent is hereby corrected as shown below:

IN THE CLAIMS

Claim No. 1, Column 9, line 61:

Delete "geomtric" and add --geometric--.

Claim No. 16, Column 11, line 35:

Add the word --the-- before the word "intercepted".

Signed and Sealed this
First Day of October, 2013

Teresa Stanek Rea
*Deputy Director of the United States Patent and Trademark Office*